June 4, 1940.　　　　　G. LEVINE　　　　　2,203,165
OIL BURNER
Filed Jan. 25, 1937
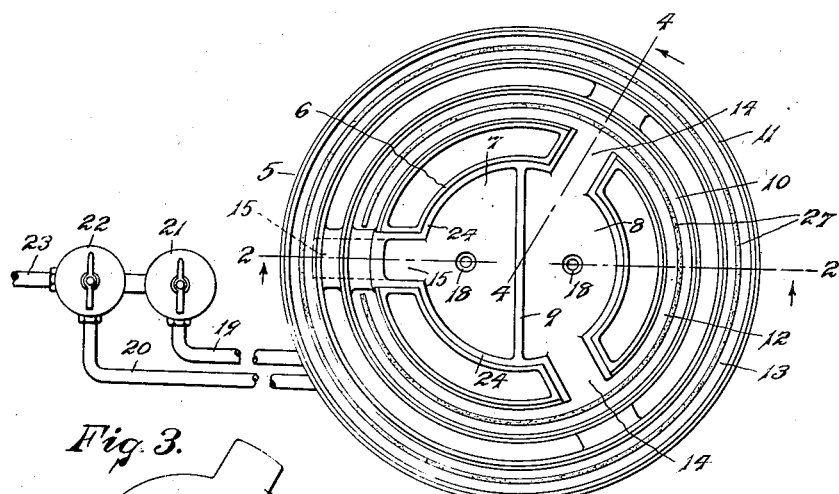
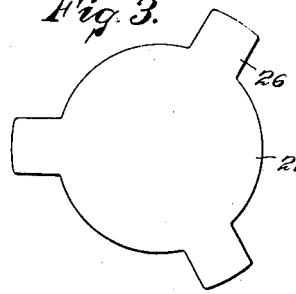
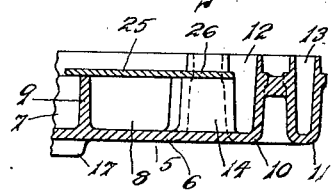
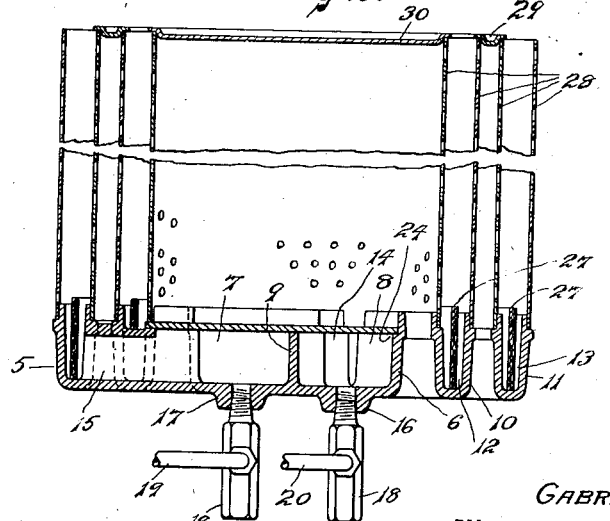
INVENTOR.
GABRIEL LEVINE
BY
Louis V. Lucia
ATTORNEYS.

Patented June 4, 1940

2,203,165

UNITED STATES PATENT OFFICE 2,203,165

OIL BURNER

Gabriel Levine, West Hartford, Conn.

Application January 25, 1937, Serial No. 122,128

5 Claims. (Cl. 158—87)

This invention relates to oil burners such as used on ranges, heaters and the like, and more particularly to oil burners of the atmospheric type which are intended for use in connection with water heaters.

It has been found that oil burners of the atmospheric type, as heretofore constructed, have not been satisfactory for use in keeping water constantly heated to a desired temperature, for the reason that when a burner of a sufficient heating capacity to heat the water in a comparatively short period of time is used, the said burner will supply more heat than is needed to maintain the water at a desired temperature after it has reached that temperature. When a burner of a sufficiently low heating capacity to maintain the water at a desired temperature is used, it will not raise the water to that temperature in a satisfactory length of time. It has, therefore, been the general practice to provide a burner of a high heating capacity so as to quickly heat the water and then shut off the said burner after the water has become heated. This is objectionable for the reason that it becomes necessary to light the burner each time that hot water is needed and furthermore, for the reason that it does not provide a constant supply of hot water.

It has also been the practice, in some cases, to provide burners having an auxiliary combustion chamber in connection with a primary combustion chamber. Such burners as heretofore constructed, however, have required a supply of fuel at two different levels. This has not proved satisfactory due to the fact that they could not be used with the conventional form of constant level fuel reservoirs, such as commonly used with burners of this type, for the reason that such reservoirs supply fuel at a single level.

The primary object of my invention, therefore, is to provide a burner which can be used with a single constant level reservoir and which may be operated to initially supply a sufficient amount of heat for quickly heating water to a desired temperature and then operated to reduce the heat supplied thereby to an amount which, by the continuous operation of the said burner, is only sufficient to subsequently maintain the water at substantially the desired temperature.

A further object of this invention is to provide a burner of this type which is simple and inexpensive in its construction as well as easy to operate.

A still further object is to provide a burner having a base member which is so constructed that it will provide, in a single unit, a primary burner and an auxiliary burner, both of which may receive fuel from a vaporizing chamber which is supplied with fuel at a single level and which is divided so as to independently supply fuel vapors to each of said burners.

Further objects of my invention may be clearly understood from the following description and from the accompanying drawing in which:

Figure 1 is a plan view of a burner base constructed in accordance with my invention.

Figure 2 is an assembly view, in vertical section, of the same on line 2—2 of Figure 1 and showing the burner shells and covers mounted upon said base.

Figure 3 is a detailed plan view of the vaporizing cover used on the said base.

Figure 4 is a fragmentary view, on line 4—4 of Figure 1, showing the vaporizing cover in position.

As shown in the drawing, the numeral 5 denotes the base of my improved burner which comprises a unitary structure having a central portion 6 that is recessed to form a central vaporizing chamber which is divided to form separate vaporizing chambers 7 and 8, by means of a partition 9. The said base also comprises an intermediate annular portion 10 and an outer annular portion 11 which are grooved to provide fuel vapor grooves 12 and 13. The groove 12 in the annular portion 10, communicates with the vaporizing chamber 8 through the ducts 14, of which there are two preferably used, and the groove 13 communicates with the vaporizing chamber 7 through the duct 15.

The bottom of said burner base is provided with a boss 16 having an opening communicating with the vaporizing chamber 8 and another boss 17 having an opening communicating with the vaporizing chamber 7.

A suitable connector 18 is threaded into each of said bosses for connecting fuel pipes 19 and 20 directly with each of said vaporizing chambers; the said pipes being connected, through the fuel control valves 21 and 22 of a conventional form, with a fuel supply pipe 23. The form of valve illustrated herewith consists of a double valve of well known construction.

The said central portion 6 is provided with a shoulder 24 surrounding the vaporizing chambers therein on an even plane with the top of the partition 9 and extending into the ports 14 and 15.

A vaporizing cover 25 is mounted upon the said shoulder, to cover the vaporizing chambers and separate them from communication with each other, and has extensions 26 thereon covering the said ports. It will be noted that port 15 is open at its top, for a distance corresponding to the port 14, and covered over the portion thereof which extends through the groove 12 into the groove 13.

A priming wick 27 is provided, in each of the fuel vapor grooves, for the purpose of heating the burner to start the operation thereof. Perforated shells 28 are mounted upon the said burner base to form combustion chambers overlying each of the said fuel vapor grooves and a cover, comprising a ring 29 and a disc 30, is mounted upon the said shells overlying the air openings which are provided in said base, between the central and the annular portions thereof, to permit passage of the necessary amount of air through said base to supply the oxygen required for the proper combustion of the fuel in the combustion chambers.

Further detailed description is omitted for the reason that burners of this type are well understood by those skilled in the art and it is believed that the description herein given is sufficient to clearly present the embodiment of my invention.

The operation of my improved burner is as follows:

When my burner is used in connection with a water heater and it is desired to initially heat the water, both of the valves 21 and 22 are turned on to supply fuel to each of the fuel grooves. The burner is then lighted and a relatively large amount of heat is supplied, by the combined operation of the intermediate and auxiliary burners, so as to bring the water to the desired temperature in a relatively short time. After the water has reached the desired temperature, the valve 21, which is connected to the groove 13 of the auxiliary burner, is shut off and, thereafter, only the primary burner will be kept in constant operation; thus supplying less heat but sufficient to retain the water constantly at the temperature which it has attained.

It will be clearly understood that, by my invention, I have provided a burner comprising a primary and an auxiliary burner each of which is independently supplied with fuel from a separate vaporizing chamber and further, that I have provided a burner base having a plurality of vaporizing chambers all of which may be supplied with fuel from the same source at the same level, and that all of the said vaporizing chambers may be covered by a single vaporizing cover; thereby permitting easy accessibility for cleaning and providing for efficiency as well as economy in construction.

It is also to be understood that, while I have shown a burner comprising one primary and one auxiliary burner, my invention may be applied to burners having more than two grooves by simply dividing the central vaporizing chamber into as many sections as may be required and connecting each separate section with a corresponding fuel groove; each of said sections, however, having a separate fuel connection in the same manner as above described and as illustrated in the drawing.

I claim:

1. For a burner of the character described, a base comprising a unitary structure including a central portion provided with a covered recess, an intermediate portion and an outer portion each having a fuel groove surrounding the said recess, a wall dividing said recess to provide a plurality of vaporizing chambers; one of said vaporizing chambers being connected by means of a port to one of said fuel grooves and another of said vaporizing chambers being connected by means of a separate port to the other of said fuel grooves and means for connecting a supply of fuel to said vaporizing chambers.

2. In a burner of the character described; a base comprising a unitary structure having a central portion, an intermediate portion and an outer portion surrounding said central portion; each of said intermediate and outer portions being provided with a fuel vapor groove, a plurality of vaporizing chambers on a single plane in said central portion, a duct connecting one of said vaporizing chambers with the fuel groove in said intermediate portion and a separate duct connecting another of said vaporizing chambers with the fuel groove in the said outer portion, a single cover overlying said vaporizing chambers and said ducts, and means for separately controlling the supply of fuel to each of said vaporizing chambers.

3. For a burner of the character described; a base comprising a unitary structure having a plurality of covered recesses forming vaporizing chambers therein, a plurality of fuel vapor grooves, a duct connecting one of said recesses with one of said grooves and a separate duct connecting another of said recesses with another of said grooves, a single cover resting on said base and overlying all of said recesses and means for separately connecting a supply of fuel to each of said recesses.

4. A burner base comprising a central portion, an intermediate portion and an outer portion; the said central portion having a recess therein divided by a wall to provide two separate chambers and each of said intermediate and outer portions having a fuel vapor groove therein; one of said fuel vapor grooves communicating with one of said chambers through an uncovered passage and another of said chambers communicating with the other of said fuel vapor grooves through a partly covered passage, a cover resting on said base and overlying the said recess to define fuel vaporizing chambers; said cover also overlying the uncovered passage and the open part of the said partly covered passage, and means for separately supplying fuel to each of the vaporizing chambers.

5. For a burner of the character described, a base comprising a unitary structure having a central open recess, a plurality of annular fuel vapor grooves surrounding said recess, ducts separately communicating each of said grooves with said central recess, a plurality of openings in the bottoms of said recess for communicating a supply of fuel with said grooves, a wall in said recess and between said openings for dividing said central recess to define separate recesses, a shoulder adjacent to said recess on a plane with the top of said wall, and a cover resting on said shoulder and on the top of said wall to define separate vaporizing chambers from said separate recesses and thereby provide a separate vaporizing chamber for each of said grooves.

GABRIEL LEVINE.